United States Patent [19]

Ittycheriah et al.

[11] Patent Number: 5,452,397
[45] Date of Patent: Sep. 19, 1995

[54] METHOD AND SYSTEM FOR PREVENTING ENTRY OF CONFUSINGLY SIMILAR PHASES IN A VOICE RECOGNITION SYSTEM VOCABULARY LIST

[75] Inventors: Abraham P. Ittycheriah, Dallas; Barbara J. Wheatley, Plano, both of Tex.

[73] Assignee: Texas Instruments Incorporated, Dalls, Tex.

[21] Appl. No.: 989,285

[22] Filed: Dec. 11, 1992

[51] Int. Cl.⁶ .............................................. G10L 9/00
[52] U.S. Cl. .................................. 395/2.49; 381/42; 395/2; 395/2.4; 395/2.48; 395/2.55; 395/2.6; 395/2.65
[58] Field of Search .................................. 381/41–42, 381/43, 46, 51; 395/2, 2.3, 2.4, 2.45, 2.48–2.49, 2.52–2.7, 2.84

[56] References Cited

U.S. PATENT DOCUMENTS

| Re. 33,597 | 5/1991 | Levinson et al. | 395/2.65 |
|---|---|---|---|
| 4,783,804 | 11/1988 | Juang et al. | 395/2.54 |
| 4,977,598 | 12/1990 | Doddington et al. | 381/43 |
| 5,027,406 | 6/1991 | Roberts et al. | 395/2 |
| 5,033,087 | 7/1991 | Bahl et al. | 395/2.65 |
| 5,054,074 | 10/1991 | Bakis | 381/41 |
| 5,129,002 | 7/1992 | Tsuboka | 395/2.49 |
| 5,142,585 | 8/1992 | Taylor | 395/2.42 |
| 5,212,730 | 5/1993 | Wheatley et al. | 395/2.52 |
| 5,218,668 | 6/1993 | Higgins et al. | 395/2 |
| 5,220,639 | 6/1993 | Lee | 395/2 |
| 5,271,088 | 12/1993 | Bahler | 395/2 |

FOREIGN PATENT DOCUMENTS 0241163 3/1987 European Pat. Off. ....... G10L 5/06

OTHER PUBLICATIONS

Fissore et al, "HMM modeling for speaker independent voice dialing in car environment"; ICASSP-92, pp. 249–252, vol. 1, 23–26 Mar. 1992.

Bendelac et al., "Eyes free dialing for cellular telephones"; 17th Convention of Electrical and Electronics Engineers in Isreal, pp. 234–237, 5–7 Mar. 1991.

Wheatley et al., "Robust automatic time alignment of orthographic transcriptions with unconstrained speech"; ICASSP '92, pp. 533–536, vol. 1, 1992.

S. S. Awad, et al., A Voice Controlled Telephone Dialer, IEEE Transaction on Instrumentation & Measurement, vol. 38, No. 1, Feb. 1989, New York, pp. 119–125.

L. R. Rabiner, et al., A Voice Controlled, Repertory-Dialer System, The Bell System Technical Journal, vol. 59, No. 7, Sep. 1980, USA, pp. 1153–1163.

*Primary Examiner*—Allen R. MacDonald
*Assistant Examiner*—Tariq Hafiz
*Attorney, Agent, or Firm*—Robert L. Troike; Richard L. Donaldson

[57] ABSTRACT

A method and system prevent the entry of confusingly similar phrases (60) in a vocabulary list (10) of a speaker-dependent voice recognition system. The method first receives (20, 30, 50) and enrolls the phrase (60) for adding to vocabulary list (10). Next, probabilities (62) are assigned to all phrases (12). Probabilities (62) assigned to already existing phrases are greater than the probability (64) assigned to the phrase (62) that the user wants to add. The phrase (60) to be added is received a second time and compared to the modified vocabulary list (61) that includes first-received phrase (60). Next, the method indicates whether the second-received phrase matches a phrase (12, 14, 16) on modified vocabulary list (61) other than first-received phrase (60).

20 Claims, 2 Drawing Sheets

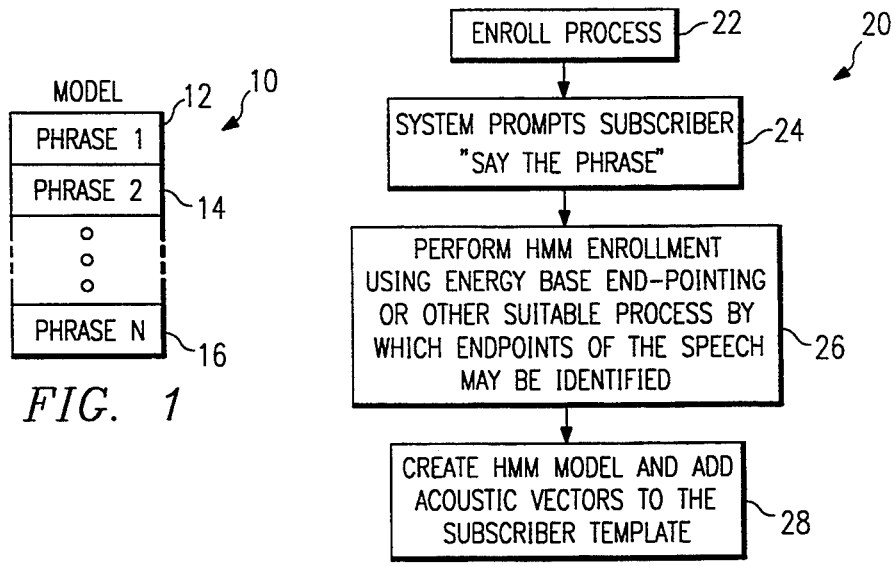
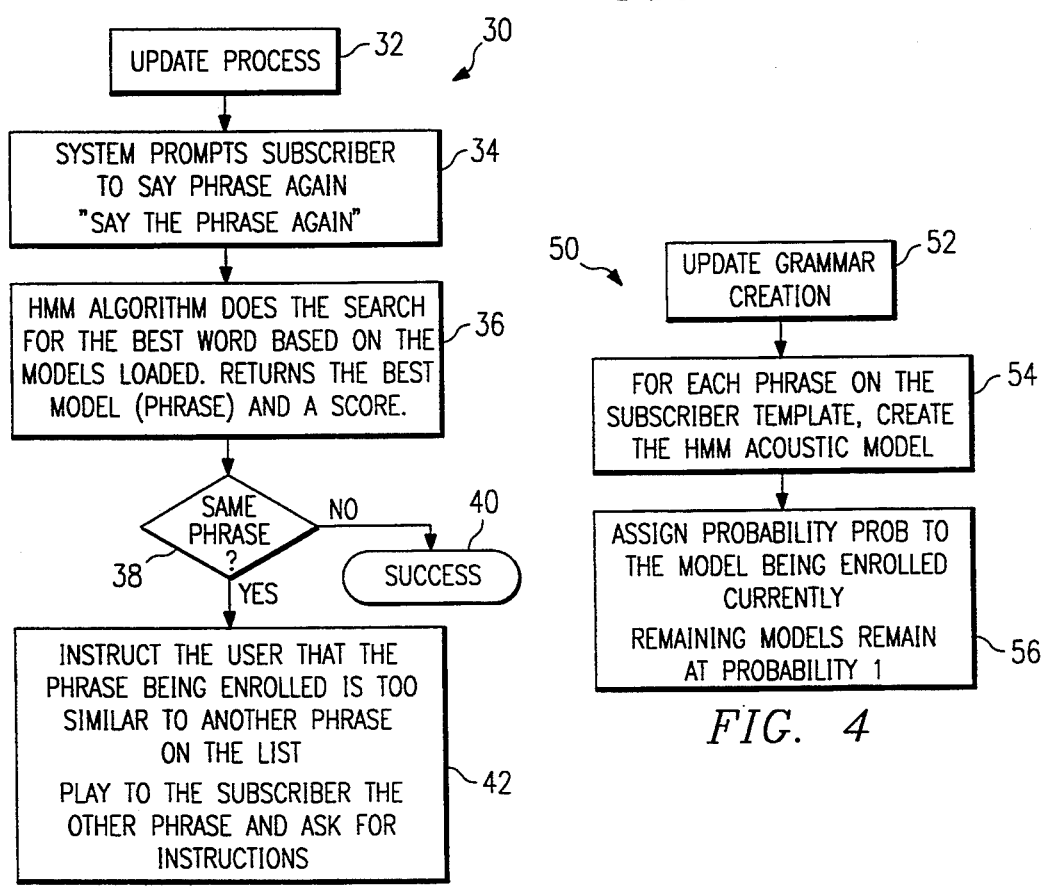

METHOD AND SYSTEM FOR PREVENTING
ENTRY OF CONFUSINGLY SIMILAR PHASES IN
A VOICE RECOGNITION SYSTEM VOCABULARY
LIST

TECHNICAL FIELD OF THE INVENTION

The present invention generally relates to voice recognition systems and, more particularly, to a method and system for preventing the entry of confusingly similar phrases in a vocabulary list of a speaker-dependent voice recognition system.

BACKGROUND OF THE INVENTION

In recent years, speaker-dependent voice recognition systems have become increasingly sophisticated. In fact, Texas Instruments provides a TI System 1500 that permits voice recognition of commands for the purpose of performing numerous functions. An important feature of voice recognition system such as the TI System 1500 is the ability to speed dial or access a party with only a voice command. For example, a person may issue a command to the voice recognition system and say "Call Bob Johnson." The voice recognition system will then access an associated pre-preprogrammed database having a telephone, or other access, number associated with a certain Bob Johnson. The system will then immediately use or dial that number.

Often, however, persons who use such speaker-dependent voice recognition systems for performing this type of voice, or "repertory," dialing forget who they have on their vocabulary list. On forgetting, a user will try to enroll a phrase that is the same as or confusingly similar to a phrase already existing on the vocabulary list. For example, if a person seeks to add to his vocabulary list the phrase "Bob Johnson" when that phrase already exists, this can result in an apparent system malfunction. Upon later seeking to call Bob Johnson, the user or subscriber will issue the "Call Bob Johnson" command, but the system can only use one of two phone numbers to make the call. Therefore, the user cannot properly control which number the system will call. Moreover, if the person adds the phrase "Bob Johnston" to the list when the confusingly similar "Bob Johnson" already exists, a similar system error may result. In either event, system malfunction will appear to occur. It is important to understand, however, that the errors that result from having more than one telephone number associated with a single phrase or a confusingly similar phrase in a vocabulary list are not due to bad system performance. Instead, the errors result from misuse of the voice recognition system.

Similar problems exist in enrolling general speaker dependent commands in a speak-dependent voice recognition systems.

Therefore, there is a need for a method and system that prevent adding already existing and confusingly similar phrases to a vocabulary list for a speaker-dependent voice recognition system.

There is a need for a system that optimizes vocabulary list functions for a speaker-dependent voice recognition system by preventing additions to the vocabulary list that will cause the system to recognize erroneously.

Furthermore, a need has arisen for an improved voice recognition system that prevents the entry of confusingly similar phrases in a vocabulary list.

SUMMARY OF THE INVENTION

The present invention, accordingly, provides a method and system that prevent the entry of confusingly similar phrases in a vocabulary list of a speaker-dependent voice recognition system that overcomes or reduces disadvantages and limitations associated with existing methods of building lists for voice recognition systems.

One aspect of the present invention is a method for preventing the entry of confusingly similar phrases in a vocabulary list of a speaker-dependent voice recognition system that includes the steps of first receiving a phrase that is to be added or enrolled in the vocabulary list. The next step is to assign a first probability to all other phrases existing on the vocabulary list and a second, but lower, probability to the first-received phrase. The next step is to have the user repeat the phrase to be enrolled. The voice recognition system will then compare the repeated phrase to the entire vocabulary list that now includes the phrase as it was first-received. The next step is to indicate whether the repeated phrase matches a phrase on the vocabulary list other than the first-received phrase. Furthermore, the method includes the step of inhibiting the addition of the phrase in the event that the repeated phrase matches a phrase on the entire vocabulary list other than the first-received phrase.

A technical advantage of the present invention is that it uses the same voice recognition algorithms existing in a speaker-dependent voice recognition system to make the distinctions between the confusingly similar phrases that a user may seek to add to the vocabulary list. This ensures that minimal additional costs will be necessary to perform the present invention. At the same time, and in critical instances, the present invention may substantially improve operation of speaker-dependent voice recognition systems.

Another technical advantage of the present invention is that by notifying the user of the confusingly similar phrase, the present invention permits the user to immediately modify its input to avoid adding the confusingly similar phrase to the vocabulary list.

BRIEF DESCRIPTION OF THE DRAWINGS

The invention and its modes of use and advantages are best understood by reference to the following description of illustrative embodiments when read in conjunction with the accompanying drawings, wherein:

FIG. 1 conceptually illustrates an exemplary vocabulary list of a speaker-dependent voice recognition system;

FIG. 2 provides a flow diagram of the steps and data flow of the enrollment process according to the preferred embodiment;

FIG. 3 shows a flow diagram of the vocabulary list update process according to the preferred embodiment;

FIG. 4 illustrates, by way of a flow diagram, the update grammar creation process according to the preferred embodiment.

DETAILED DESCRIPTION OF THE INVENTION

Figures 5, 6:
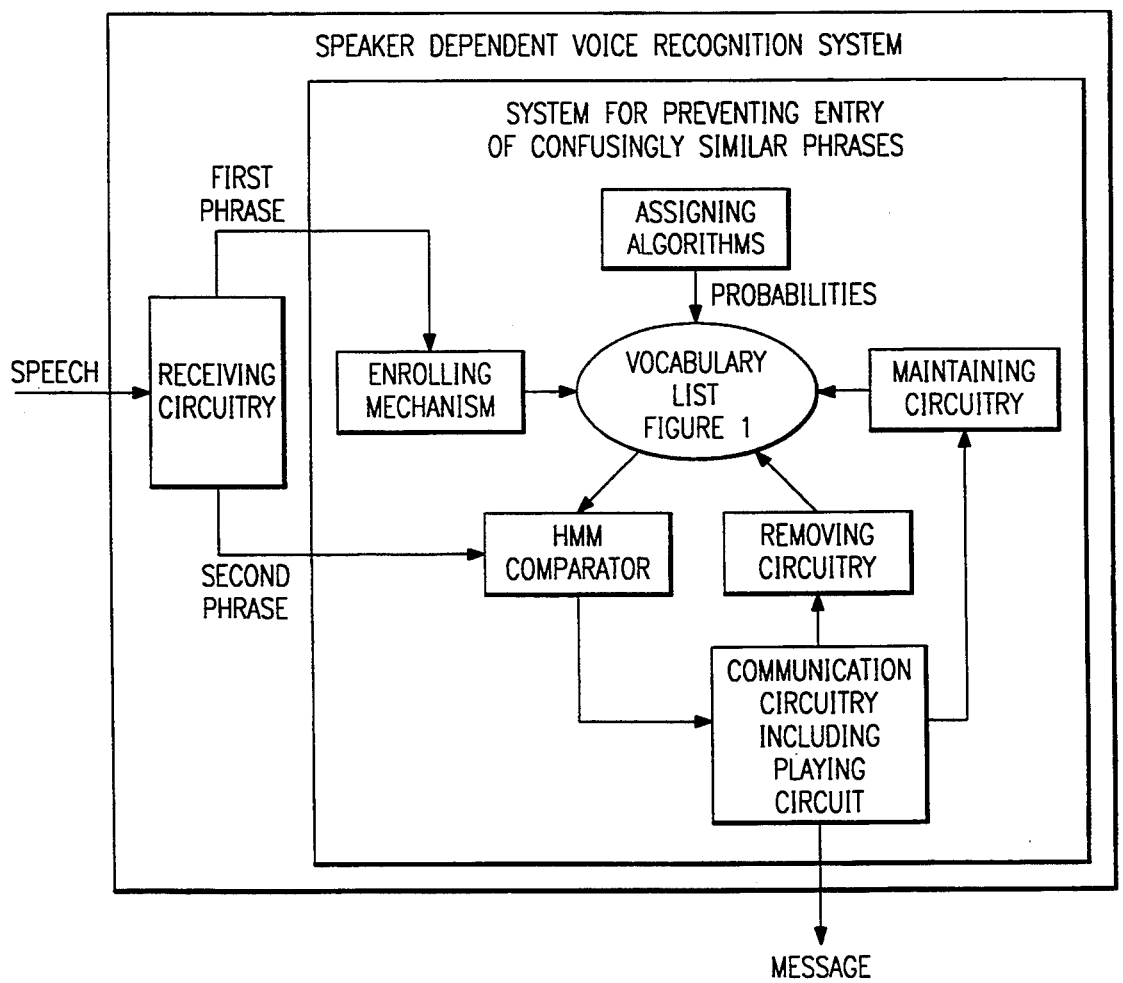
FIG. 5 is a conceptual illustration of a vocabulary list modified for the purposes of the present invention and FIG. 6 is a system according to one embodiment of the present invention.

The preferred embodiment of the present invention is best understood by referring to the FIGUREs, wherein like numerals are used for like and corresponding parts of the various drawings.

FIG. 1 conceptually illustrates an exemplary list 10 of phrases that form a vocabulary list of a speaker-dependent voice recognition system for use with the preferred embodiment. The vocabulary list 10 of FIG. 1 may, for example, be a repertory dialing list of names for a voice-activated speed dialing system. A voice recognition system that may use the preferred embodiment of the present invention is a Texas Instruments System 1500 operating with a voice recognition application system having the phrase HG. Although this system is largely dependant upon software and algorithms to perform the inventive concepts of the present invention, circuitry and components may similarly perform the functions of the present invention. The present invention, therefore, clearly contemplates the use of circuitry to perform these functions.

Vocabulary list 10 of FIG. 1 includes phases such as "Phrase 1" at the position indicated by reference numeral 12, "phrase 2" at the position that 14 indicates, and continuing on down to "Phrase N" at the position of reference numeral 16. One purpose of a speaker-dependent voice recognition system is to permit a user to add phrases to vocabulary list 10 and then call those phrases for command and control. For example, using the voice recognition system, a user may say "Call Phrase 1," at which point the system recognizes the voice command and calls the person or location associated with "Phase 1."

Often users of the speaker-dependent voice recognition systems may forget what phrases are on their vocabulary list. Sometimes, when forgetting, a user may try to enroll a phrase again or may try to enroll a phrase that is similar to an existing phase without regard for previously enrolled phrases. If either one of these instances occur, for example, vocabulary list 10 may end up with phrases that should not be on the vocabulary list. This causes confusion and may reduce the value or utility of vocabulary list 10. To avoid these problems, the preferred embodiment of the present invention provides a method and system to prevent confusingly similar phases from existing on vocabulary list 10.

FIG. 2 shows the process flow of enrollment process 20 of the preferred embodiment. The user or subscriber will begin the enrollment process as indicated by block 22. This may be done by directing to the speaker-dependent voice recognition enrollment a command such as "review list." The system will then, for example, prompt the subscriber by the command "say the speed-dial phrase" at step 24. The receiving circuitry of the voice recognition will then receive the phase to be added. Next, the voice recognition system performs a process such as that known as Hidden Markov Modeling (HMM) enrollment using an energy based end-pointing or another suitable technique for identifying end points of the speech. This is performed at step 26. An example of the HMM process that the preferred embodiment performs may be found at J. Picone, *Continuous Speech Recognition Using Hidden Markov Models*, Speech and Image Understanding Laboratory, Texas Instruments, Inc., May 7, 1990 (reprint from IEEE ASSP Magazine). The next steps, as block 28 indicates, are to create an HMM model using HMM technique and to add acoustic vectors to the subscriber template. Once enrollment process 20 is complete, the next step is to update vocabulary list 10.

FIG. 3 illustrates the update process 30 of the preferred embodiment. Beginning at block 32, the first step is for the voice recognition system to indicate to the subscriber that it is updating vocabulary list 10. The voice recognition system then prompts the subscriber to repeat the phrase. The voice recognition system may, for example, use the command: "Say the speed-dial name again," as indicated at block 34. Next, the voice recognition system performs the HMM algorithm to search for the best phase based on the models loaded in a database associated with the voice recognition system at block 36. This is a comparison step that identifies whether the same or a confusingly similar phrase is on vocabulary list 10. The voice recognition system then returns the best model (i.e. phrase) and a score associated with that model. At block 38, the method of the preferred embodiment queries whether the returned phrase is the same as the one that the subscriber seeks to enroll. If so, the voice recognition system communicates this information to the subscriber as a "success," as block 40 shows. The voice recognition system will then maintain the phrase on vocabulary list 10. If not, the system instructs the subscriber that the phrase he seeks to enroll is too similar to another phrase on vocabulary list 10, as block 42 shows. At this time, the method is to play back to the subscriber the confusingly similar phrase that is on vocabulary list 10 and then ask for instructions. The preferred embodiment, therefore, rejects the phrase from the enrollment process.

A key process of the preferred embodiment is the creation of models that are acoustic models of all phrases on the template. FIG. 4 shows process 50 by which acoustic models are made for all phrases on vocabulary list 10. Beginning at block 52, the voice recognition system updates the grammar creation. Then, for each phrase on vocabulary list 10, the system creates an HMM acoustic model for the phrase to be enrolled at block 54. The next step is assign a probability, as indicated by the variable "PROB," to the model for the phrase being currently enrolled in vocabulary list 10, at block 56. Also, at block 56 all phrases that remain will be assigned a probability of 1. The value for the probability parameter PROB is chosen to maximize the discrimination of similar phrases while minimizing the probability that the phrase output is indeed different from the one being enrolled.

The result of the above enrollment process 20, update process 30, and update grammar creation process 50 is a modified vocabulary list that achieves the objectives of the preferred embodiment. FIG. 5 conceptual shows a vocabulary list as modified by the process of the preferred embodiment. In particular, along with "PHRASE 1" at position 12, "PHRASE 2" at position 14, on through "PHRASE N" at position 16, in the modified vocabulary list "PHRASE i" has been enrolled. Column 62 indicates the associated probability for each of the models on vocabulary list 10. For example, "PHRASE 1," "PHRASE 2," and "PHRASE N" all have a 1.0 probability value. At "PHRASE i," the probability variable PROB, having a value less than 1.0, is assigned position 60. This gives "PHRASE i" the probability necessary to support the discrimination that the preferred embodiment performs.

OPERATION

Although the method and system as described above make operation of the present invention clear, the following discussion helps make operation even more explicit. The following example, therefore, illustrates operation of the preferred embodiment. Suppose, for example, a user decides to add the phrase "Bob Johnston" to vocabulary list 10. The user may then provide to the voice recognition system the command "review list" to begin the enrollment process. Then, the system will, at step 24 of FIG. 2, prompt the user by saying "Say the speed-dial phrase." Next, the user will say "Bob Johnston." The preferred embodiment will then enroll the phrase "Bob Johnston" and create a "Bob Johnston" HMM model according to steps 26 and 28 of FIG. 2.

Immediately thereafter, the system will update vocabulary list 10 and prompt the user to "Say the speed-dial phrase again." (See FIG. 3) Once the user says the phrase "Bob Johnston" again, the HMM algorithm will search to see if on vocabulary list 10 there is a match with the phrase "Bob Johnston." Before this occurs, however, through the method of the preferred embodiment, all of the phrases on vocabulary list 10, except for the phrase "Bob Johnston," will have assigned to it the probability of 1.0. (See FIG. 4) The phrase "Bob Johnston" will be assigned a probability, for example, of 0.8 (i.e., less than the probabilities of all other phrases on vocabulary list 10).

Suppose, for example, that on vocabulary list 10 is the phrase "Bob Johnson." In this event, because the probability of a match between "Bob Johnston" said again and "Bob Johnson" is 1.0, whereas the probability is 0.8 for "Bob Johnston," the system may more likely return to the user a match with the phrase "Bob Johnson." At this point, the preferred embodiment will test to see if there is a match between the phrase said a second time and the phrase as first-received (i.e., the phrase with the lower associated probability). In this example, this is not the case. The user, therefore, will be instructed that the phrase being enrolled is too similar to another phrase on the list. The system will then play back to the user a command such as "You are attempting to enter the phrase Bob Johnston, but the phrase Bob Johnson already exists in the data base. Please select another phrase." Other similar instructions may be provided to the user instead of these. In essence, however, operation of the preferred embodiment will permit more error-free use of vocabulary list 10 in a speaker-dependent voice processing system.

In other phases, when a user seeks to add a confusingly similar phrase the vocabulary list the first step is to do an update in the learning process. This update begins with an enrollment by which a model of the added phrase is created. The next step is to have the user repeat the phrase and attempt to superimpose the first phrase on the second one or update it to make a better model. Traditionally, what is done in an attempt to make a better model is to assign an equal probability to all phrases or, similarly, update the single model irrespective of what other phrases are on the list. The preferred embodiment, instead, evaluates the repeated phrase and, in the update, assigns probabilities to all phrases so that the system favors all other phrases over the phrase that the user seeks to add to the vocabulary list. By having a greater probability assigned to all other phrases than the phrase first spoken, similarly sounding phrases will be selected over the phrase first spoken or the phrase the user desires to enroll. Thus, the preferred embodiment tests the phrase to be enrolled against all other phrases that are presently on the vocabulary list. This is done by artificially lowering the probability that the system will recognize the second spoken phrase as the first spoken phrase. This entire comparison process is performed by the voice recognition system software such as the HG system software used in the Texas Instruments System 1500 voice recognition system.

Although the above description details the preferred embodiment, the present invention also contemplates at least one alternative embodiment. The alternative embodiment includes the steps of executing the recognition algorithm on the enrollment data using all phrase voice models except the one to be newly added to the system. In this situation, the recognizer will typically find the best match among the remaining models. The alternative method then employs a decision rule based on the score of the false match and the score obtained in the correct model to determine whether to accept the new phrase in vocabulary list 10. The alternative embodiment then adds the new phrase if the difference between the false match score and the correct match score is below a predetermined threshold. The voice recognition system will then inform the user that the phrase was or was not acceptable to add.

Although the present invention has been described in detail, it should be understood that various changes, substitutions, and alterations may be made hereto without departing from the spirit and scope of the invention as defined by the appended claims.

Referring to FIG. 6, there is illustrated the system according to one embodiment of the present invention. The speaker dependent voice recognition system, for example, is the TI System 1500 which when programmed with the HG software according to the above description and the above referenced flow charts, becomes a system with receiving circuitry for first receiving a first-received phrase for adding to a plurality of other phrases on a vocabulary list (FIG. 1), an enrolling mechanism enrolling the first-received phrase, receiving circuitry for further receiving a second phrase, assigning algorithm circuitry for aligning probabilities, comparison circuitry for comparing the second-received phrase to the vocabulary list and first-received phrase and other phrases using Hidden Markov Models, communication circuitry for indicating whether the second-received phrase matches one of the other phrases and circuitry for removing the enrollment of the first-received phrase to the vocabulary list in the event that the second-received phrase matches one of the plurality of the phrases on the list. Further, the system provides maintaining circuitry for maintaining the first-received phrase on the list in the event that the comparison circuitry matches the second-received phrase to the first-received phrase. Further, the circuitry assigning probabilities is such that a probability maximizes the discrimination of similarities between the second-received phrase and each of the plurality of other phrases and minimizes the likelihood the voice recognition system will match the second-received phrase with a different phrase from the first-received phrase. The circuitry where the second probability is unitary. The communication circuitry includes circuitry playing a message stating that the first-received phrase is too similar to at least one of the plurality of other phrases.

What is claimed is:

1. A method for preventing the entry of confusingly similar phrases in a vocabulary list of a speaker-dependent voice recognition system, comprising the steps of:
   first receiving a first-received phrase for adding to a plurality of other phrases on a vocabulary list;
   enrolling said first-received phrase in said vocabulary list;
   assigning a first probability to said phrase and a second probability to each of said plurality of other phrases, said second probability having a greater value than said first probability;
   receiving a second-received phrase, said second-received phrase sounding essentially the same as said first-received phrase, said first probability and said second probability controlling the likelihood that said speaker-dependent voice recognition system will match said second-received phrase to said first-received phrase or said plurality of other phrases on said vocabulary list;
   comparing said second-received phrase to said vocabulary list including said first-received phrase and said plurality of other phrases;
   indicating whether said second-received phrase matches one of said plurality of other phrases; and
   removing the enrollment of said first-received phrase to said vocabulary list in the event that said second-received phrase matches one of said plurality of other phrases.

2. The method of claim 1, wherein said comparing step is performed using a Hidden Markov Modeling process.

3. The method of claim 1, further comprising the step of maintaining said first-received phrase in said vocabulary list in the event that said comparing step matches said second-received phrase to said first-received phrase.

4. The method of claim 1, wherein said first probability maximizes the discrimination of similarities between said second-received phrase and each of said plurality of other phrases and minimizes the likelihood that said voice recognition system will match said second-received phrase with a different phrase from said first-received phrase.

5. The method of claim 1, wherein said indicating step comprises the step of playing a message stating that said first-received phrase is too similar to at least one of said plurality of other phrases.

6. The method of claim 1, wherein said second probability is a unitary probability.

7. The method of claim 1, wherein said enrolling step comprises the step of enrolling said first-received phrase using an energy-based end-pointing process.

8. A system for preventing the entry of confusingly similar phrases in a vocabulary list of a speaker-dependent voice recognition system, comprising:
   receiving circuitry associated with said speaker-dependent voice recognition system for first receiving a first-received phrase for adding to a plurality of other phrases on a vocabulary list;
   an enrolling mechanism for enrolling said phrase in said first-received vocabulary list;
   assigning algorithm circuitry for assigning a first probability to said phrase and a second probability to each of said plurality of other phrases said second probability having a greater value than said first probability;
   said receiving circuitry for further receiving a second-received phrase, said second-received phrase sounding essentially the same as said first-received phrase, said first probability and said second probability controlling the likelihood that said voice recognition system will match said second-received phrase to said first-received phrase or said plurality of other phrases on said vocabulary list;
   comparison circuitry for comparing said second-received phrase to said vocabulary list, including said first-received phrase and plurality of other phrases;
   communication circuitry for indicating whether said second-received phrase matches one of said plurality of other phrases; and
   circuitry for removing the enrollment of said first-received phrase to said vocabulary list in the event that said second-received phrase matches one of said plurality of other phrases.

9. The system of claim 8, wherein said comparison circuitry further comprises circuitry for performing said comparing using Hidden Markov Models.

10. The system of claim 8, further comprising maintaining circuitry for maintaining said first-received phrase in said vocabulary list in the event that said comparison circuitry matches said second-received phrase to said first-received phrase.

11. The system of claim 8, wherein said first probability maximizes the discrimination of similarities between said second-received phrase and each of said plurality of other phrases and minimizes the likelihood that said voice recognition system will match said second-received phrase with a different phrase from said first-received phrase.

12. The system of claim 8, wherein said communication circuitry further comprises playing circuitry playing a message stating that said first-received phrase is too similar to at least one of said plurality of other phrases.

13. The system of claim 8, wherein said second probability is a unitary probability.

14. The system of claim 8, wherein said enrolling mechanism comprises a means for enrolling said first-received phrase using energy-based end-pointing.

15. An improved speaker-dependent voice recognition system for preventing the entry of confusingly similar phrases in a vocabulary list, the system comprising:
   a speaker-dependent voice recognition system for responding to vocal commands;
   receiving circuitry associated with said speaker-dependent voice recognition system for first receiving a first-received phrase for adding to a plurality of other phrases on a vocabulary list;
   an enrolling mechanism for enrolling said first-received phrase in said vocabulary list;
   assigning algorithm circuitry for assigning a first probability to said phrase and a second probability to each of said plurality of other phrases said second probability having a greater value than said first probability;
   said receiving circuitry for further receiving a second-received phrase, said second-received phrase sounding essentially the same as said first-received phrase, said first probability and said second probability controlling the likelihood that said voice recognition system will match said second-received phrase to said first-received phrase or said plurality of other phrases on said vocabulary list;

comparison circuitry for comparing said second-received phrase to said vocabulary list, including said first-received phrase and said plurality of other phrases; and communication circuitry for indicating whether said second-received phrase matches one of said plurality of other phrases; and rejection circuitry for removing the enrollment of said first-received phrase to said vocabulary list in the event that said second-received phrase matches one of said plurality of other phrases.

16. The improved system of claim 15, wherein said comparison circuitry further comprises circuitry for performing said comparing using a Hidden Markov Models.

17. The improved system of claim 15, further comprising maintaining circuitry for maintaining said first-received phrase in said vocabulary list in the event that said comparison circuitry matches said second-received phrase to said first-received phrase.

18. The improved system of claim 15, wherein said first probability maximizes the discrimination of similarities between said second-received phrase and each of said plurality of other phrases and minimizes the likelihood that said voice recognition system will match said second-received phrase with a different phrase from said first-received phrase.

19. The improved system of claim 15, wherein said communication circuitry further comprises playing circuitry playing a message stating that said first-received phrase is too similar to at least one of said plurality of other phrases.

20. The improved system of claim 15, wherein said second probability is a unitary probability.

* * * * *